United States Patent Office 3,508,186
Patented Apr. 21, 1970

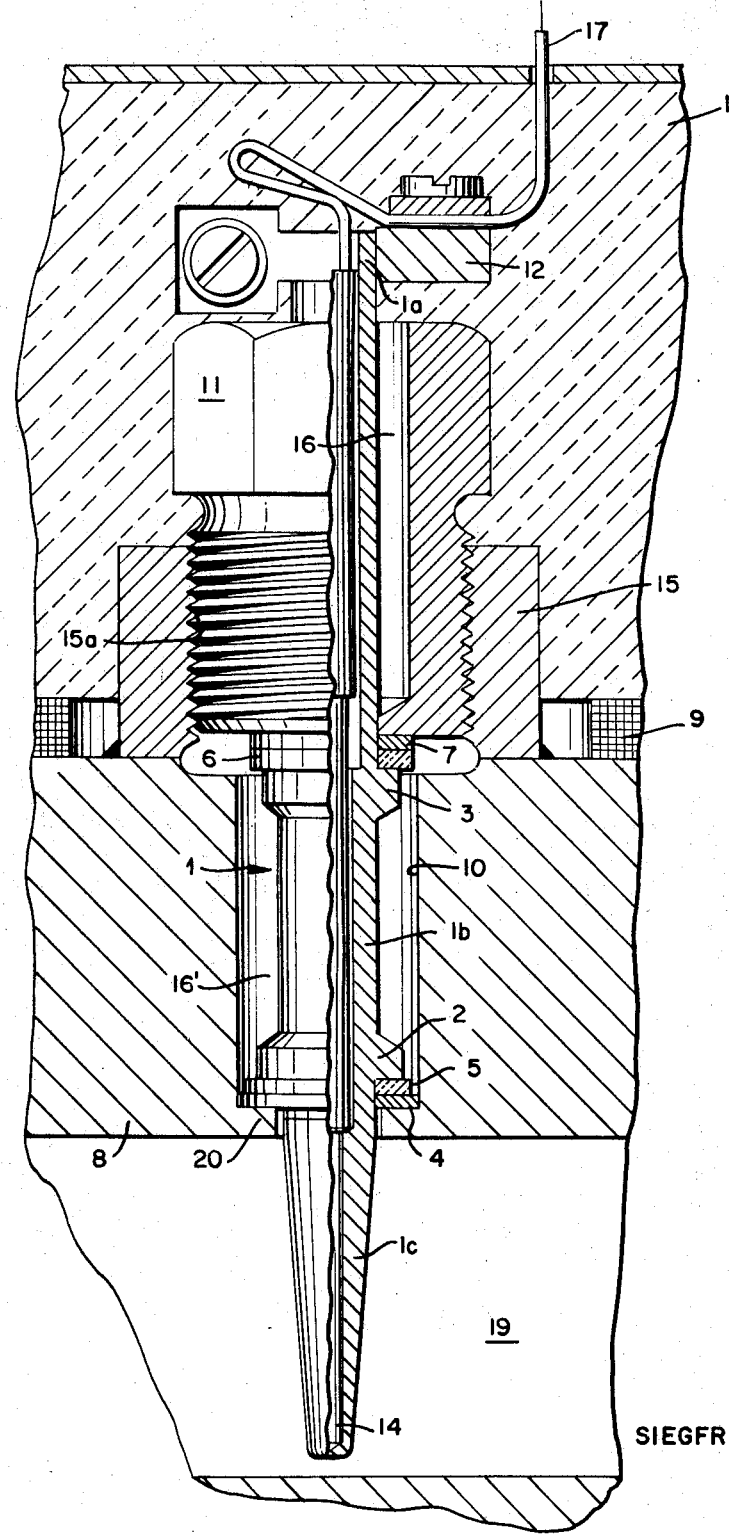

1

3,508,186
RESISTANCE THERMOMETER
Bernd Böhm, Erwin Genz, Peter Nilse, Wilhelm-Pieck-Stadt Guben, and Siegfried Socher, Wilhelm-Pieck-Stadt Guben-Kaltenborn, Germany, assignors to VEB Chemiefaserkombinat Wilhelm - Pieck - Stadt Guben, Germany
Filed Apr. 16, 1968, Ser. No. 721,684
Int. Cl. C01k 7/22; H01c 7/04
U.S. Cl. 338—28     7 Claims

ABSTRACT OF THE DISCLOSURE

The temperature sensing resistor inset is fitted within a conical lower portion of an elongated protective receptacle. The middle portion of the receptacle is provided with a radially protruding lower abutment ring for abutting an inner flange in a bore of a heated wall, and with a radially protruding upper abutment ring for counteracting a tubular pressing screw disposed around the upper portion of the receptacle to engage a screw socket mounted at the site of installation. Respective contact surfaces are termally insulated.

---

This invention relates to a temperature measuring device and, more particularly, to a resistance thermometer installed in a heated wall of a device for measuring temperature of a high pressure medium streaming behind this wall, such as melted plastics in extruders, for instance.

It has been known from prior art how to measure temperature as a function of the variation of the electrical resistance of a wire. However, the known devices of this kind have a short coming in an insufficient thermal insulation between the temperature sensitive element and the site of installation. The receptacle for the temperature sensing elements in these devices is installed either within a protective tube which is in contact with the site of installation or in direct contact with the measured medium. Nevertheless, the known fasteners, such as screwed joints and the like, can insure only an inferior thermal insulation.

Should these known devices be employed, for example, for measuring temperature in a medium which is heated from without and located in the proximity of the site of measurement, and should the temperature of the medium differ from that of the site of installation, a substantial error reading would result due to the above mentioned poor insulation between the securing element and the supporting means. For instance, should a known device be installed in the wall of an extruder to measure temperature of melted polyamide material and should the difference in temperature between the point of installation and the measured medium be 20° C., and error reading from 14° to 16° C. would be measured.

It is, therefore, the primary object of this invention to substantially reduce, eventually to eliminate this disadvantage of the known devices, and to provide a resistance thermometer which would meet the following requirement:

In order to prevent dissipation of heat at the point of measurement, a minimum temperature sensing surface is to be in contact with the medium to be measured;

a good heat transfer must be secured between the metal active part of the receptacle and thesensing element embedded therein;

the active part of the receptacle of the sensing element must withstand severe stresses in the streaming high-pressure medium;

2 a minimum heat transfer must be attained between the receptacle and the heated walls;

no heat dissipation must occur between the receptacle of the sensing element and the ambient temperature (e.g. air temperature); and the temperature sensing element must be replaceable without removing the receptacle from the site of installation.

In accordance with the present invention, the above objects are attained in that the metal lower portion of the receptacle which contains the sensing resistor element has a streamlined profile and conical configuration. The temperature sensitive resistance element is closely fitted within this active lower portion in close contact with the inner surface thereof. A large air gap is created between the heated wall and, at the same time, metal contact surfaces between the latter and the receptacle are reduced to a minimum. The top portion of the receptacle is terminated with a clamping member which holds feed wires of the resistor sensing element. The top portion of the receptacle is further surrounded by a temperature insulating layer. Furthermore, the active lower portion of the receptacle has a reduced depth of immersion into the meduim to be measured.

For a better understanding of the invention, its operating advantages and the specific objects attained by its use, reference should be had to the accompanying drawing and description, in which:

The single figure illustrates a side elevation view, partially in cross-section, of the resistance thermometer of this invention installed in a heated wall of a processing device.

With reference to the drawing, a temperature conducting wall 8 of an extrusion channel 19 is heated by means of heating means 9 mating an outer surface area of this wall. At the site of installation of the thermometer, a stepped bore 10, having an inner step or flange 20 for supporting the thermometer, is provided in the wall 8. A tubular screw socket 15 having an inside thread 15a is welded to the wall 8 around the upper opening of the bore 10 for receiving a tubular pressure screw 11.

The resistance thermometer consists of an elongated tubular receptacle 1 which has an upper portion 1a passing through the pressure screw 11, center portion 1b located within the bore 10 and a lower active portion 1c protruding into channel 19 to contact the flowing medium, the temperature of which is to be measured.

The active lower portion 1c must withstand static pressures as high as 300 kp./cm.$^2$ and resist pressures caused by flowing of the polyamide melt both when starting the process and during continuous operation of the extrusion spinning device. For this reason, the active portion 1c is tapered toward its end and profiled in a streamlined configuration so that the metal surface directly contacting the medium is reduced to a minimum.

Within the conical active portion 1c, a temperature sensing resistance element 14, in the present embodiment a platinum coil inset having 100 ohm at 0° C., is closely fitted so as to insure a maximum heat transfer between the conical portion 1c and the element 14. Feed conductors 17 of the resistance element 14 extend through the center of the receptacle and, in order to be secured against pulling out, conductors 17 are affixed to a clamping member 12 which is removably attached to the upper portion 1a of the receptacle 1.

The middle portion 1b of the receptacle which is situated within the bore 10 is provided with a radially protruding lower abutment ring 2 and with a radially protruding upper abutment ring 3, the both rings being integral with the receptacle and having greater diameter than the latter so that a free air gap results therebetween.

The lower abutment ring 2 rests upon a heat insulating washer 5 and sealing washer 4 which abuts the inner flange 20 within the bore 10, thus supporting the entire thermometer. The upper abutment ring is also provided with a heat insulating washer 6 and with a steel protective washer 7. The tubular pressing crew 11 is concentrically disposed about the upper portion 1a and is in mesh with the inner thread 15a of the screw socket 15. The bottom surface of the screw 11 abuts the protective washer 7 and exerts pressure on the upper abutment ring 3 of the receptacle, thereby forcing the entire thermometer against the supporting flange 20. As a result of this arrangement, minimum metal to metal contacts are secured between the heated wall 8 and the receptacle 1. Moreover, the washer 4 and the screw 15 serve for centering the position of the receptacle 1 in the bore 10 thus insuring a good thermal insulation by means of resulting air gaps 16 and 16'.

To prevent heat dissipation from the upper portion 1a of the receptacle to the outer air, the upper portion 1a, with the clamping member 12, are situated within a heat insulating layer 13 surrounding the heater 9.

When installing the receptacle 1, certain precaution is to be taken to insure proper orientation of the streamlined cone in the direction of the stream in the channel 19.

In comparison with the known devices, the thermometer according to this invention substantially reduces reading error caused by heating the site of installation, so that at a measured difference in temperature of 20° C. between the medium and the heated wall an error of at the most 3–4° C. in the reported temperature of the medium would be observed for the construction in accordance with the invention.

What is claimed is:

1. A resistance thermometer for installation within a stepped bore in a heated wall of a device to measure temperature of a medium behind said heated wall, comprising:
    an elongated receptacle means adapted for receiving a temperature sensitive resistance element and feeds means thereof;
    said receptacle means having a lower, middle and upper portions;
    said lower portion containing said temperature sensitive resistance element and being adapted for contacting the medium to be measured, said lower portion being cone shaped, the width of the cone decreasing continuously toward the tip thereof;
    said middle portion being increased in diameter to provide both a lower abutment means and an upper abutment means adapted for installation within said stepped bore and for leaving an air gap therebetween;
    pressure means disposed on said device for exerting pressure on said upper abutment means; and
    heat insulating means provided between said lower abutment means and the step of said stepped bore and between said upper abutment means and said pressure means.

2. The resistance thermometer according to claim 1 wherein said upper portion of said receptacle means is disposed within an outer insulation layer of said heated wall.

3. The resistance thermometer according to claim 1 wherein metal contact surfaces between said abutment means and said heated wall are reduced to a minimum.

4. The resistance thermometer according to claim 3 wherein the surface contact between said abutment means and said heated wall is reduced to a minimum by insertion of bodies of insulating material between said abutment means and said heated wall.

5. The resistance thermometer according to claim 1 wherein said pressure means is a screw socket integral with said heated wall and a tubular screw engaging said screw socket and surrounding said upper portion of said receptacle means to exert pressure on said upper abutment means.

6. The resistance thermometer according to claim 1 wherein said lower portion is of relatively small length whereby only a small portion of said receptacle means extends into the medium the temperature of which is to be measured.

7. The resistance thermometer according to claim 1 wherein said receptacle means is formed as a unitary integral structure.

References Cited

UNITED STATES PATENTS

| | | | |
|---|---|---|---|
| 2,307,626 | 1/1943 | Kelly | 338—28 |
| 2,398,892 | 4/1946 | Kelly | 338—28 |
| 2,590,041 | 3/1952 | Roost | 338—28 |
| 2,973,495 | 2/1961 | Greenberg | 338—28 |
| 3,147,457 | 9/1964 | Gill et al. | |
| 3,308,666 | 3/1967 | Anderson et al. | 338—28 |

RODNEY D. BENNETT, Jr., Primary Examiner

H. C. WAMSLEY, Assistant Examiner

U.S. Cl. X.R.

73—362